United States Patent
Qian et al.

(10) Patent No.: US 11,081,967 B2
(45) Date of Patent: Aug. 3, 2021

(54) SELF-ADAPTIVE SYNCHRONOUS RECTIFICATION CONTROL SYSTEM AND METHOD OF ACTIVE CLAMP FLYBACK CONVERTER

(71) Applicant: SOUTHEAST UNIVERSITY, Jiangsu (CN)

(72) Inventors: Qinsong Qian, Jiangsu (CN); Shengyou Xu, Jiangsu (CN); Qi Liu, Jiangsu (CN); Weifeng Sun, Jiangsu (CN); Shengli Lu, Jiangsu (CN); Longxing Shi, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 135 days.

(21) Appl. No.: 16/617,508

(22) PCT Filed: Sep. 28, 2018

(86) PCT No.: PCT/CN2018/108177
§ 371 (c)(1),
(2) Date: Nov. 27, 2019

(87) PCT Pub. No.: WO2020/015189
PCT Pub. Date: Jan. 23, 2020

(65) Prior Publication Data
US 2021/0194375 A1    Jun. 24, 2021

(30) Foreign Application Priority Data
Jul. 18, 2018 (CN) .......................... 201810788897.7

(51) Int. Cl.
*H02M 3/335* (2006.01)
*H02M 1/08* (2006.01)
*H02M 1/00* (2006.01)

(52) U.S. Cl.
CPC ......... *H02M 3/33592* (2013.01); *H02M 1/08* (2013.01); *H02M 1/0048* (2021.05)

(58) Field of Classification Search
CPC ........................... H02M 3/33592; H02M 1/08
See application file for complete search history.

(56) References Cited

U.S. PATENT DOCUMENTS

2006/0018135 A1    1/2006  Yang et al.
2013/0329464 A1 *  12/2013 Yang ................. H02M 3/33515
                                                            363/21.02
(Continued)

FOREIGN PATENT DOCUMENTS

CN    104300795    1/2015
CN    104539163    4/2015
(Continued)

OTHER PUBLICATIONS

"International Search Report (Form PCT/ISA/210) of PCT/CN2018/108177," dated Apr. 15, 2019, pp. 1-4.

*Primary Examiner* — Thienvu V Tran
*Assistant Examiner* — Bart Iliya
(74) *Attorney, Agent, or Firm* — JCIPRNET (57) ABSTRACT

The invention discloses a self-adaptive synchronous rectification control system and a self-adaptive synchronous rectification control method of an active clamp flyback converter. The control system comprises a sampling and signal processing circuit, a control circuit with a microcontroller as a core and a gate driver. According to the control method, a switching-on state, an early switching-off state, a late switching-off state and an exact switching-off state of a secondary synchronous rectifier of the active clamp flyback converter can be directly detected, and the synchronous rectifier and a switching-on time of the synchronous rectifier in next cycle can be controlled according to a detection result. After several cycles of self-adaptive control, the (Continued)

synchronous rectifier enters the exact switching-on state, thus avoiding oscillation of an output waveform of the active clamp flyback converter.

9 Claims, 7 Drawing Sheets

(56) References Cited

U.S. PATENT DOCUMENTS

2015/0229219 A1\* 8/2015 Choi ................. H02M 3/33569
  363/21.03
2019/0229634 A1\* 7/2019 Moon ............... H02M 3/33515

FOREIGN PATENT DOCUMENTS

CN 107979288 5/2018
CN 109067181 12/2018

\* cited by examiner

A silicon device is used
as a primary side

ND ACTIVE CLAMP FLYBACK
SELF-ADAPTIVE SYNCHRONOUS RECTIFICATION CONTROL SYSTEM AND METHOD OF ACTIVE CLAMP FLYBACK CONVERTER

CROSS-REFERENCE TO RELATED APPLICATION

This application is a 371 of international application of PCT application serial no. PCT/CN2018/108177, filed on Sep. 28, 2018, which claims the priority benefit of China application no. 201810788897.7, filed on Jul. 18, 2018. The entirety of each of the above mentioned patent applications is hereby incorporated by reference herein and made a part of this specification.

TECHNICAL FIELD

The present invention relates to a self-adaptive synchronous rectification control system and a self-adaptive synchronous rectification control method, and more particularly, to a self-adaptive synchronous rectification control system and a self-adaptive synchronous rectification control method of an active clamp flyback converter.

BACKGROUND

A flyback converter is one of the commonly used topologies in application of a small power converter. In recent years, because of having an advantage of using leakage inductance energy to realize soft switching, a duty ratio greater than 0.5, higher working frequency and efficiency, etc., an active clamp flyback converter has gradually become a solution for improving power density, and switching frequency and efficiency of a small power converter.

In the prior art, a synchronous rectifier is used for replacing a diode in a secondary loop of the active clamp flyback converter, so that switching-on losses of the secondary diode can be reduced, and the efficiency of the converter can be greatly improved. However, due to different characteristics of a system of an active clamp flyback converter, currents flowing through the secondary synchronous rectifier are quite different. In addition, a change of a switching-off state of the synchronous rectifier can also cause larger fluctuation of a voltage $V_{ds}$ at two ends of a drain source. When the synchronous rectifier is switched off "too early", if a GaN synchronous rectifier is used as a secondary side of the active clamp flyback converter, $V_{ds}$ has a large voltage undershoot fluctuation; and when the synchronous rectifier is switched off "too late", since a parasitic capacitance of the secondary side of the active clamp flyback converter participates in a primary resonance, $V_{ds}$ has a large voltage oscillation after switching off, and the rectifier can even be damaged. In the prior art, there is a lack of an ideal synchronous rectification control solution to solve this problem. Therefore, it is necessary to propose a control method for the synchronous rectifier of the active clamp flyback converter.

In the existing synchronous rectification control method, there are mainly three control solutions, respectively comprising: 1) judging switching-on and switching-off time by detecting a magnitude of a current flowing through the synchronous rectifier; 2) determining the switching-on and switching-off time by detecting the voltages at two ends of the drain source of the synchronous rectifier and comparing the voltages with voltages of switching-on and switching-off threshold values; and 3) judging whether the synchronous rectifier is switched off early or not by detecting the switching-on time of a body diode after the synchronous rectifier is switched off through a microcontroller (MCU) or external hardware, and changing the switching-on time in next cycle, so as to realize self-adaptive synchronous rectification control. Among the three synchronous rectifier control solutions, the current detection method has a high accuracy, but the sampling resistance loss is large and the method is gradually eliminated; the detection of the power supply voltage cannot avoid the switching on of a parasitic body diode of the synchronous rectifier, and when a parasitic inductance of PCB routing around the synchronous rectifier is too large, it is easy to lead to too long switching-off time in advance, thus leading to large loss of the body diode; the existing self-adaptive synchronous rectification control solution using digital control can effectively reduce the switching-on time of the parasitic body diode of the synchronous rectifier, but still enables a switching-off point of the synchronous rectifier to wander back and forth between conditions that the body diode is switched on or not, and a suitable switching-off point cannot be found, so that the synchronous rectifier cannot be switched off exactly at an accurate point, and the efficiency of the active clamp flyback converter cannot be improved.

SUMMARY

Technical problem to be solved by the present invention: by using the working characteristics of an active clamp flyback converter to directly detect a switching-on state, an early switching-off state, a late switching-off state and an exact switching-off state of a secondary synchronous rectifier, the present invention proposes a self-adaptive synchronous rectification control system and a self-adaptive synchronous rectification control method of an active clamp flyback converter, which, after several cycles of detection and adjustment, enables the synchronous rectifier to be switched off exactly at an accurate point, thus reducing oscillation in a working waveform of the active clamp flyback converter and improving a working efficiency of the converter. Meanwhile, comparators in a microcontroller are multiplexed by time division, which improves a utilization rate of hardware resources, thus reducing a system volume and decreasing the costs.

The following technical solutions are used in the present invention to solve the technical problem above.

A self-adaptive synchronous rectification control system of an active clamp flyback converter comprises a sampling and signal processing circuit, a control circuit with a microcontroller as a core and a gate driver, wherein an input end of the sampling and signal processing circuit is connected with a drain of a secondary synchronous rectifier of the active clamp flyback converter, a first output end and a second output end of the sampling and signal processing circuit are both connected with the control circuit with a microcontroller as a core, an output end of the control circuit with a microcontroller as a core is connected with an input end of the gate driver, and an output end of the gate driver is connected with a gate of the secondary synchronous rectifier of the active clamp flyback converter.

The control circuit with a microcontroller as a core comprises a first comparator, a second comparator, a counter, a register, a control unit and a pulse width modulation (PWM) timer, the first comparator, the second comparator and the PWM timer are actual hardware function modules inside the microcontroller, the counter, the register and the control unit are software function modules implemented on a hardware basis of the microcontroller, a first sensing voltage signal outputted by the first output end of the sampling and signal processing circuit is connected with an inverting input end of the first comparator, a second sensing voltage signal outputted by the second output end of the sampling and signal processing circuit is connected with an inverting input end of the second comparator, non-inverting input ends of the first comparator and the second comparator are both connected with the control unit, and an output signal A of the first comparator is connected with a first input end of the register; an output signal B of the second comparator is connected with an input end of the counter, the counter records high and low level change times N of the output end signal B of the second comparator, and an output signal N of the counter is connected with a second input end of the register; the first output end and the second output end of the register are both connected with the control unit; an output signal of the control unit is connected with the PWM timer; and an output signal of the PWM timer is connected with the gate driver.

In order to improve the utilization rate of the hardware resources, the first comparator is multiplexed by time division in the same cycle, according to the working state of the secondary synchronous rectifier SR of the active clamp flyback converter, a voltage $V_t$ of the non-inverting input end of the first comparator is set as different threshold values by the control unit: the $V_t$ is defined as a first threshold value $V_{t1}$ when the SR is switched on, and the $V_t$ is defined as a second threshold value $V_{t2}$ when the SR is switched off. A non-inverting input potential of the second comparator is set as a fixed threshold value $V_{t3}$ by the control unit, and is used for judging the switching-off state of the secondary synchronous rectifier of the active clamp flyback converter.

The output signal A of the first comparator is connected with the input end of the register; the output signal B of the second comparator is connected with the input end of the counter; the counter is used for recording the high and low level change times N of the output end signal B of the second comparator, and the output signal N of the counter is connected with the register; and the first output end and the second output end of the register are both connected with the control unit, PWM parameters of a synchronous rectification switch outputted by the control unit are connected with the PWM timer, the output signal of the PWM timer is connected with the gate driver, and an output end of the gate driver is connected with a gate of the synchronous rectifier SR.

A self-adaptive synchronous rectification control method of an active clamp flyback converter proposed in the present invention has the following working principles: in a working cycle of the active clamp flyback converter, the control unit provides different non-inverting input voltage threshold values to the first comparator according to different working states of the synchronous rectifier: $V_t$ is defined as a first threshold value $V_{t1}$ when the active clamp flyback converter is operated in a detection period of the switching-on state of the secondary synchronous rectifier, and $V_t$ is defined as a second threshold value $V_{t2}$ when the active clamp flyback converter is operated in a detection period of the switching-off state of the secondary synchronous rectifier. A drain source voltage $V_{ds}$ of the secondary synchronous rectifier of the active clamp flyback converter is collected and processed by the sampling and signal processing circuit, and is respectively outputted as a first sensing voltage $V_{SR1}$ and a second sensing voltage $V_{SR2}$, the first sensing voltage $V_{SR1}$ and the second sensing voltage $V_{SR2}$ are respectively compared and logically judged with the first threshold value $V_{t1}$ and the second threshold value $V_{t2}$ by the control circuit with a microcontroller as a core to directly detect the switching-on state, the "early" switching-off state, the "late" switching-off state and the "exact" switching-off state of the secondary synchronous rectifier, and the switching on of the synchronous rectifier in the current working cycle and a switching-on time of the synchronous rectifier in the next working cycle are controlled according to detection results.

In a working cycle of the active clamp flyback converter, the control unit provides different non-inverting input voltage threshold values to the first comparator according to different working states of the synchronous rectifier, which is specifically as follows.

(1) When the active clamp flyback converter is operated in a $[D \times T_s, \frac{1}{2} \times (1+D) \times T_s]$ period in each cycle, the control unit sets the input voltage $V_t$ of the first comparator as the first threshold value $V_{t1}$ for detecting the switching-on state of the secondary synchronous rectifier of the active clamp flyback converter, wherein D is a switching-on duty ratio of a primary main power switch of the active clamp flyback converter, and $T_s$ is the working cycle of the active clamp flyback converter.

(2) When the active clamp flyback converter is operated in a $[\frac{1}{2} \times (1+D) \times T_s, T_s]$ period in each cycle, the control unit sets the input voltage $V_t$ of the first comparator as the second threshold value $V_{t2}$ for detecting a switching-off time of the secondary synchronous rectifier of the active clamp flyback converter, wherein D is the switching-on duty ratio of the primary main power switch of the active clamp flyback converter, and $T_s$ is the working cycle of the active clamp flyback converter.

The first sensing voltage $V_{SR1}$ and the second sensing voltage $V_{SR2}$ are respectively compared and logically judged with the first threshold value $V_{t1}$ and the second threshold value $V_{t2}$ by the control circuit with a microcontroller as a core to detect the switching-on state of the synchronous rectifier. The switching-on state of the secondary synchronous rectifier of the active clamp flyback converter is in response to the condition that the output signal A of the first comparator is at the high level in the period when the control unit provides the first threshold value $V_{t1}$.

During state detection, the first sensing voltage $V_{SR1}$ and the second sensing voltage $V_{SR2}$ are respectively compared and logically judged with the first threshold value $V_{t1}$ and the second threshold value $V_{t2}$ by the control circuit with a microcontroller as a core, and the counter is used for recording an inversion times N of high and low potentials of the output signal B of the second comparator in the microcontroller. According to values of N and A, the switching-off state of the synchronous rectifier is judged, and a control algorithm for a switching-on time of the synchronous rectifier in next cycle is proposed, which is specifically as follows.

After the synchronous rectifier is switched off, when the first sensing voltage signal $V_{SR1}$ is less than the second threshold value $V_{t2}$, A is at the high level; when the first sensing voltage signal $V_{SR1}$ is greater than the second threshold value $V_{t2}$, A is at the low level; and the register latches the value of A after the synchronous rectifier is switched off.

After the synchronous rectifier is switched off, when the second sensing voltage signal $V_{SR2}$ is less than a third threshold value $V_{t3}$, B is at the high level; when the second sensing voltage signal $V_{SR2}$ is greater than the third threshold value $V_{t3}$, B is at the low level; and the counter records level inversion times N of an output signal B of the second comparator after the synchronous rectifier is switched off.

The switching-off state detection is judged in a sequence as follows:

step A-1: comparing a magnitude relationship between N and 2: when N is greater than or equal to 2, entering step A-2; and when N is less than 2, entering step A-3;

step A-2: judging that the synchronous rectifier SR is switched off too late according to that N is greater than or equal to 2, then reducing a switching-on time of the synchronous rectifier SR in next cycle by $\Delta T_1$, i.e., $T_{on}^{n+1} = T_{on}^{n+1} - \Delta T_1$;

step A-3: judging that the synchronous rectifier SR is not switched off too late according to that N is less than 2, then comparing a magnitude of A: when A is at the high level, entering Step A-4; and when A is at the low level, entering step A-5;

step A-4: judging that the synchronous rectifier SR is switched off too early according to that N is less than 2 and A is at the low level, then increasing the switching-on time of the synchronous rectifier SR in next cycle by $\Delta T_2$, i.e., $T_{on}^{n+1} = T_{on}^n + \Delta T_2$; and step A-5: judging that the synchronous rectifier SR is exactly switched off according to that N is less than 2 and A is at the high level, then keeping the switching-on time of the synchronous rectifier SR in next cycle unchanged, i.e., $T_{on}^{n+1} = T_{on}^n$.

According to the self-adaptive synchronous rectification control method of an active clamp flyback converter above, after several cycles of adjustment, the synchronous rectifier can be exactly switched off at a correct switching-off point, thus improving an efficiency of the system and avoiding oscillation of a working waveform of the active clamp flyback converter.

According to the self-adaptive synchronous rectification control method of an active clamp flyback converter proposed in the present invention, a fixed state detection period, a minimum switching-on time and a minimum switching-off time of the synchronous rectifier are set to avoid repeated switching on and switching off, false switching on, and false switching off of the synchronous rectifier, which are specifically as follows:

(1) a state detection period of the switching-on state of the secondary synchronous rectifier of the active clamp flyback converter, i.e., the $[D \times T_s, \frac{1}{2} \times (1+D) \times T_s]$ period in each working period: the state detection period of the switching-on state starts at a time when the primary main power switch of the active clamp flyback converter is completely switched off and ends at a time point at ½ of a switching-on time of a primary clamp switch of the active clamp flyback converter;

(2) a state detection period of the switching-off state of the secondary synchronous rectifier of the active clamp flyback converter, i.e., the $[\frac{1}{2} \times (1+D) \times T_s, T_s]$ period in each working period: the state detection period of the switching-off state starts at a time point at ½ of the switching-on time of the primary clamp switch of the active clamp flyback converter and ends at a switching-on time point of the primary main power switch of the active clamp flyback converter; and (3) the minimum switching-on time and the minimum switching-off time: after the secondary synchronous rectifier of the active clamp flyback converter is switched on, a switching-off operation cannot be performed in the minimum switching-on time $T_{on(min)}$, and a duration of the minimum switching-on time is one quarter of the switching-off time of the active clamp flyback converter, i.e., $\frac{1}{4} \times (1-D) \times T_s$; and after the secondary synchronous rectifier of the active clamp flyback converter is switched off, a switching-on operation cannot be performed in the minimum switching-off time, and a duration of the minimum switching-off time is a dead time from switching off of a clamp switch to switching on of a main power switch of the active clamp flyback converter, i.e., $T_{dead2}$.

Compared with the prior art, the technical solutions used in the present invention above have the following technical effects.

1. The switching-on state of the secondary synchronous rectifier of the active clamp flyback converter can be directly detected and accurately controlled, the "early" switching-off state, the "late" switching-off state and the "exact" switching-off state of the secondary synchronous rectifier of the active clamp flyback converter can be directly detected, and the switching-on time of the synchronous rectifier in next cycle can be controlled according to detection results. After several cycles of adjustment, the synchronous rectifier can be switched off exactly, thus improving a self-adaptive adjustment capability of the synchronous rectifier, significantly attenuating oscillation of a working waveform of the converter, and reducing interference and noise; and the losses of the active clamp flyback converter are reduced and an efficiency of the system is improved.

2. The minimum switching-on time and the minimum switching-off time are set, no matter what type of power switch is used for a secondary side of the active clamp flyback converter, the synchronous rectifier can be normally switched on and off, and repeated switching on and switching off of the secondary synchronous rectifier of the active clamp flyback converter in a cycle caused by circuit voltage fluctuation can be avoided.

3. In a working cycle of the active clamp flyback converter, the first comparator is multiplexed by time division according to different working states of the synchronous rectifier, thus saving hardware resources, reducing circuit costs and simplifying debugging difficulty.

4. The self-adaptive synchronous rectification control method of an active clamp flyback converter proposed in the present invention is applied to the primary power switch of which different types of devices are used, and the switching-on state of the synchronous rectifier can be detected.

DETAILED DESCRIPTION

The technical solutions of the present invention are further described in detail below with reference to the drawings.

Figure 1:
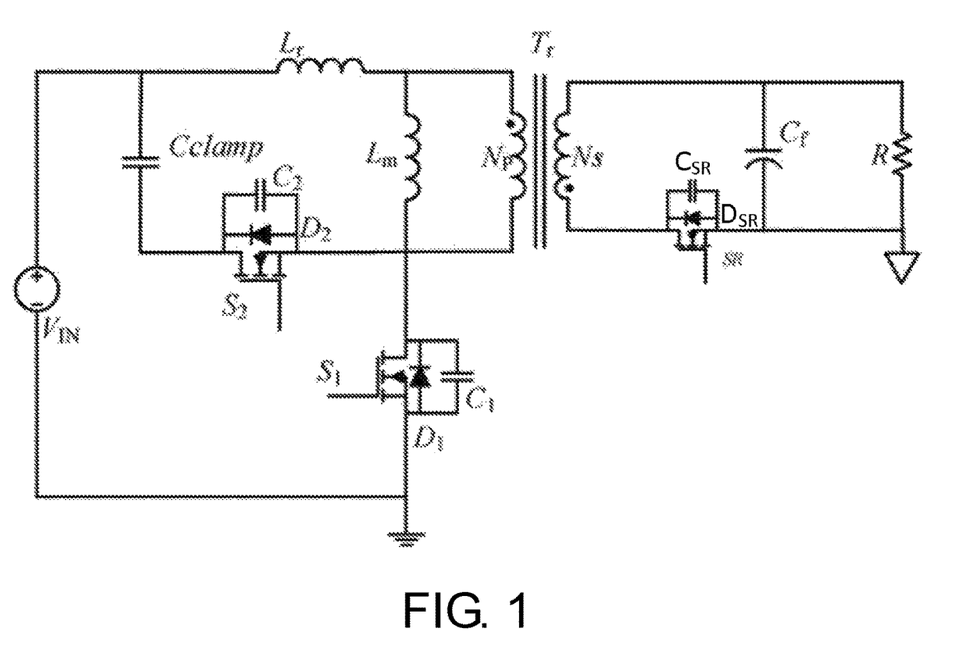
FIG. 1 is a topological structure diagram of an active clamp flyback converter used in the embodiment.

FIG. 1 shows a topological structure of an active clamp flyback converter used in the embodiment, which comprises: an input DC source $V_{IN}$, a transformer $T_r$, a resonant inductor $L_r$, an magnetizing inductor $L_m$, a main power switch $S_1$, a clamp switch $S_2$, a clamp capacitor $C_{clamp}$, a secondary synchronous rectifier SR, an output filter capacitor $C_f$ and a load resistor R, wherein the resonant inductor $L_r$ and the magnetizing inductor $L_m$ can be regarded as a part of the transformer $T_r$.

One end of the resonant inductor $L_r$, one end of the clamp capacitor $C_{clamp}$ and a positive terminal of the input DC source $V_{IN}$ are connected, and the other end of the resonant inductor $L_r$, one end of the magnetizing inductor $L_m$ and one end of a primary winding of the transformer $T_r$ are connected with a dotted terminal of the primary winding $N_p$ of the transformer $T_r$; the other end of the primary winding of the transformer $T_r$, the other end of the magnetizing inductor $L_m$, a drain of the main power switch $S_1$ and a source of the clamp switch $S_2$ are connected; a source of the main power switch $S_1$ and a negative terminal of the input DC source $V_{IN}$ are connected and grounded; and a drain of the clamp switch $S_2$ is connected with the other end of the clamp capacitor $C_{clamp}$.

A dotted terminal of a secondary winding $N_s$ of the transformer $T_r$ corresponding to the primary winding $N_p$ of the transformer $T_r$ is connected with a drain of the secondary synchronous rectifier SR; the other end of the secondary winding $N_s$ is connected with the output filter capacitor $C_f$ and the load resistor R; and the other end of the output filter capacitor $C_f$, the other end of the load resistor R and a source terminal of the secondary synchronous rectifier SR are connected and grounded.

Figure 2:
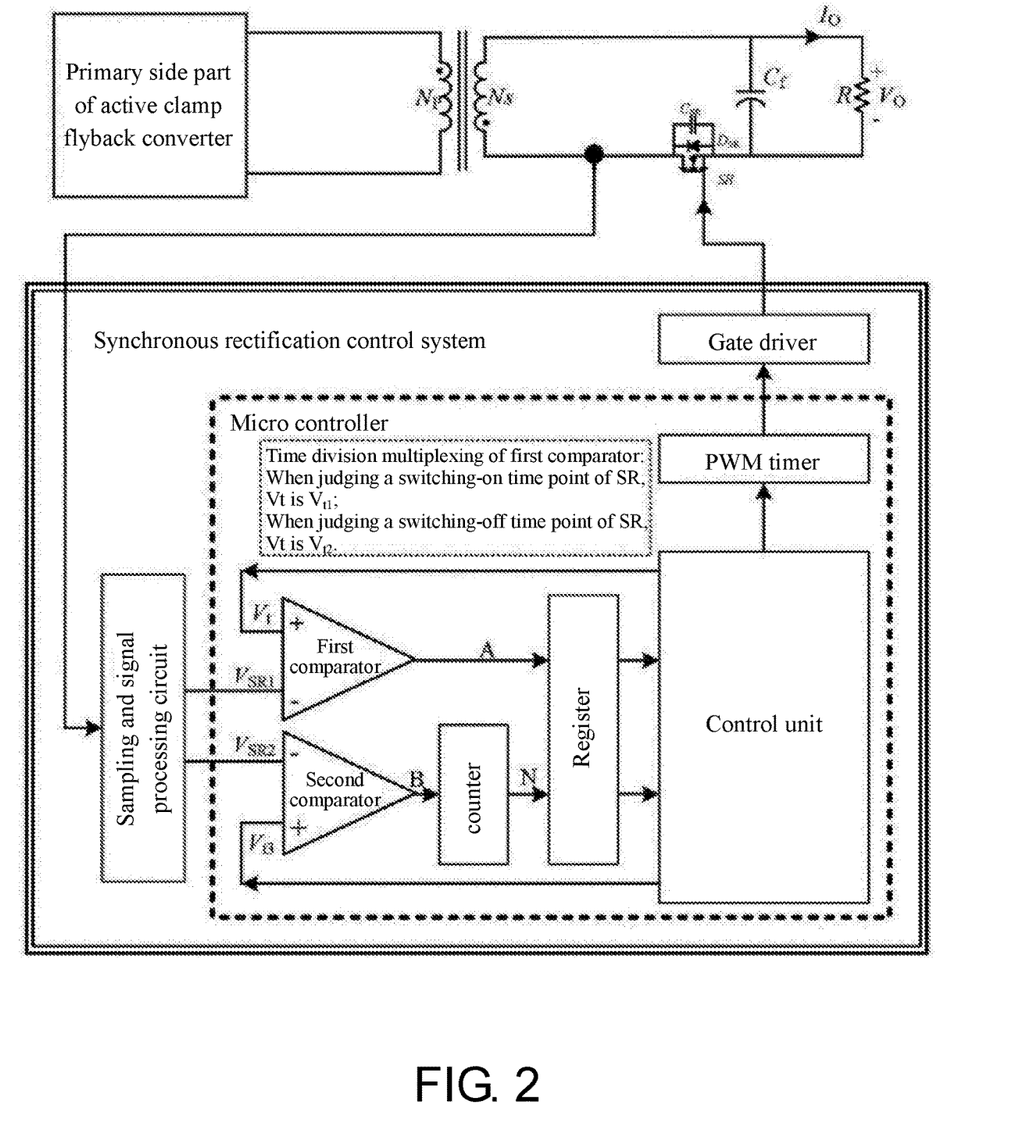
FIG. 2 is a structure block diagram of a secondary circuit of an active clamp flyback converter and a self-adaptive synchronous rectification control system of an active clamp flyback converter proposed in the present invention.

As shown in FIG. 2, the present invention proposes a self-adaptive synchronous rectification control system of an active clamp flyback converter, which comprises a sampling and signal processing circuit, a control circuit with a microcontroller and a gate driver. The control circuit with a microcontroller as a core comprises a first comparator, a second comparator, a counter, a register, a control unit and a PWM timer. The first comparator, the second comparator and the PWM timer are actual hardware function modules inside the microcontroller, and the counter, the register and the control unit are software function modules implemented on a hardware basis of the microcontroller.

An input end of the sampling and signal processing circuit is connected with the drain of the secondary synchronous rectifier SR of the active clamp flyback converter; an output signal $V_{SR1}$ of a first output end of the sampling and signal processing circuit is connected with an inverting input end of the first comparator; and an output signal $V_{SR2}$ of a second output end of the sampling and signal processing circuit is connected with an inverting input end of the second comparator.

Non-inverting input ends of the first comparator and the second comparator are both connected with the control unit. In order to improve the utilization rate of the hardware resources, the first comparator is multiplexed by time division in the same cycle, according to the working state of the secondary synchronous rectifier SR of the active clamp flyback converter, a voltage $V_t$ of the non-inverting input end of the first comparator is set as different threshold values by the control unit: the $V_t$ is defined as a first threshold value $V_{t1}$ when the active clamp flyback converter is operated in a switching-on state detection period of the SR, and the $V_t$ is defined as a second threshold value $V_{t2}$ when the active clamp flyback converter is operated in a switching-off state detection period of the SR. A non-inverting input potential of the second comparator is set as a fixed threshold value $V_{t3}$ by the control unit, and is used for judging the switching-off state of the secondary synchronous rectifier of the active clamp flyback converter.

The output signal A of the first comparator is connected with the input end of the register; the output signal B of the second comparator is connected with the input end of the counter; the counter is used for recording the high and low level change times N of the output end signal B of the second comparator, and the output signal N of the counter is connected with the register; and the first output end and the second output end of the register are both connected with the control unit, PWM parameters of a synchronous rectification switch outputted by the control unit are connected with the PWM timer, the output signal of the PWM timer is connected with the gate driver, and an output end of the gate driver is connected with a gate of the synchronous rectifier SR.

First Embodiment

Figure 3:
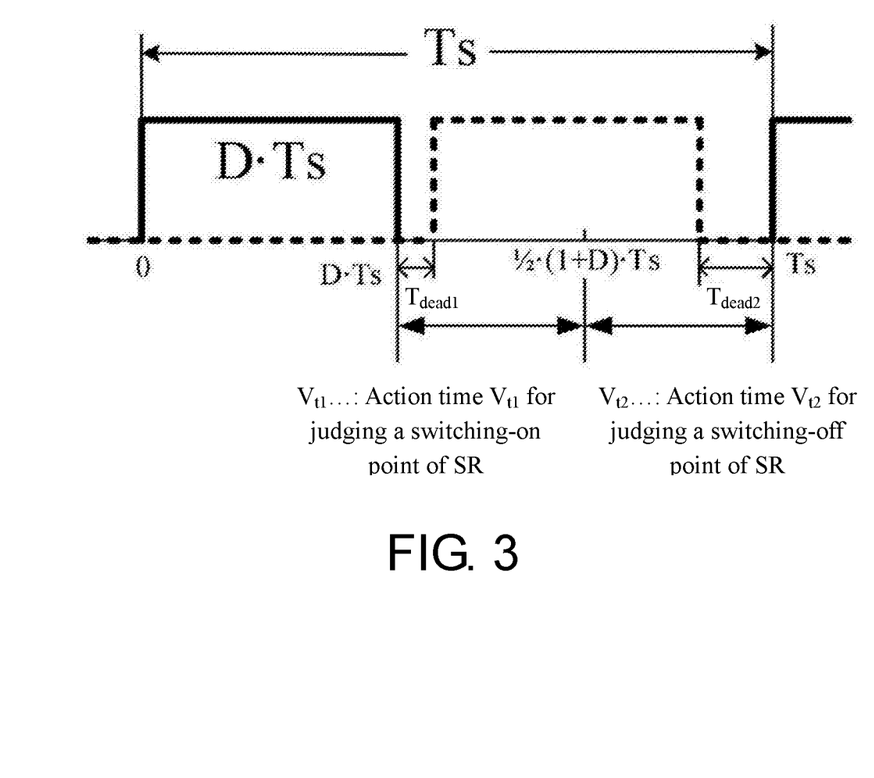
FIG. 3 is a diagram of action periods of a first threshold value $V_{t1}$ and a second threshold value $V_{t2}$ of a non-inverting input end of a first comparator, and a state detection time of a synchronous rectifier.

With reference to a diagram of action periods of a first threshold value $V_{t1}$ and a second threshold value $V_{t2}$ of a non-inverting input end of a first comparator, and a state detection time of a synchronous rectifier in FIG. 3, the technical solution of multiplexing the first comparator by time division in state detection of the synchronous rectifier is described in detail in the embodiment, which is specifically as follows.

An active clamp flyback converter shown in FIG. 1 is used, a duty ratio of a gate driving signal $V_{gs}$ of a primary main power switch $S_1$ is defined as D, and a working cycle of the active clamp flyback converter is defined as $T_s$, i.e., a working cycle of the main power switch $S_1$ is $T_s$, then a switching-on period of the main power switch $S_1$ is expressed as: $T_{on}=D\times T_s$; and a switching-off period of the main power switch $S_1$ is expressed as: $T_{off}=(1-D)\times T_s$. The gate driving signal $V_{gs}$ of the primary main power switch $S_1$ is shown by a solid line in FIG. 3, and a gate driving signal $V_{gs}$ of the primary clamp switch is shown by a dashed line in FIG. 3.

An action period of the first threshold value $V_{t1}$ starts at a switching-off time of the main power switch $S_1$, i.e., an ending time of $T_{on}$, if a starting time of the current working cycle is 0, an expression of the time is $D\times T_s$; and the action period of the first threshold value $V_{t1}$ ends at an intermediate time of $T_{off}$, i.e., the intermediate time of $T_{off}$, if a starting time of the current working cycle is 0, an expression of the time is $D\times T_s+\frac{1}{2}\times(1-D)\times T_s=\frac{1}{2}\times(1+D)\times T_s$. Therefore, the action period of the first threshold value $V_{t1}$ is expressed as $[D\times T_s, \frac{1}{2}\times(1+D)\times T_s)$; and in the period, the first comparator is used for detecting a switching-on state of the synchronous rectifier.

An action period of the second threshold value $V_{t2}$ starts at the intermediate time of $T_{off}$, i.e., $\frac{1}{2}\times(1+D)\times T_s$; and the action period of the second threshold value $V_{t2}$ ends at the ending time of $T_s$, i.e., $T_s$. Therefore, the action period of the second threshold value $V_{t2}$ is expressed as $[\frac{1}{2}\times(1+D)\times T_s,$ $T_s$]; and in the period, the first comparator is used for detecting a switching-off state of the synchronous rectifier.

The detections of the switching-on state and the switching-off state of the secondary synchronous rectifier SR of the active clamp flyback converter belong to two different periods in the same working cycle respectively, so that the present invention proposes to realize different detection objects by using the same detection hardware in different periods through different control logics, i.e., the first comparator is multiplexed by time division in a working cycle to detect a switching-on state and an early switching-off state of the synchronous rectifier: when the first threshold value $V_{t1}$ is inputted to a non-inverting input end of the first comparator, i.e., a [$D \times T_s$, $\frac{1}{2} \times (1+D) \times T_s$] period, the period is a state detection period of the switching-on state of the secondary synchronous rectifier of the active clamp flyback converter, so that the first comparator is used for detecting the switching-on state of the synchronous rectifier; and when the second threshold value $V_{t2}$ is inputted to the non-inverting input end of the first comparator, i.e., a [$\frac{1}{2} \times (1+D) \times T_s$, $T_s$] period, the period is a state detection period of the switching-off time of the secondary synchronous rectifier of the active clamp flyback converter, so that the first comparator is used for detecting the switching-off state of the synchronous rectifier.

Second Embodiment

A logic flow of the detection and control of a switching-on state of a secondary synchronous rectifier when a silicon device is used as a primary power switch of an active clamp flyback converter, and a logic flow of the detection and control of the switching-on state of the secondary synchronous rectifier when a gallium nitride device is used as the primary power switch of the active clamp flyback converter are described in detail.

Figure 4:
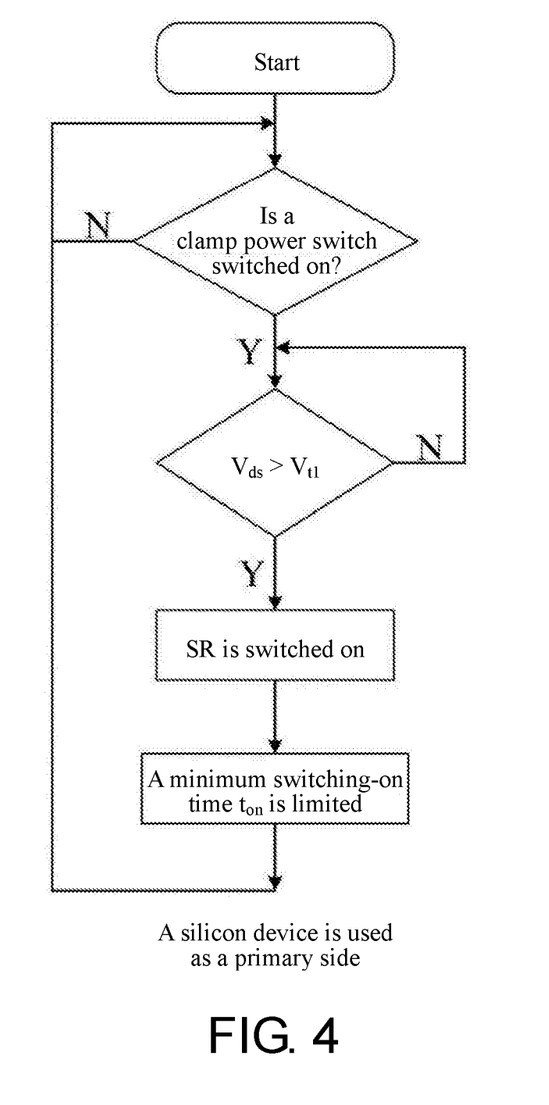
FIG. 4 is a logic flow chart of the detection and control of a switching-on state of a secondary synchronous rectifier when a silicon device is used as a primary power switch of the active clamp flyback converter.

When the silicon device is used as the primary power switch of the active clamp flyback converter, the logic flow of the detection and control of the switching-on state of the secondary synchronous rectifier is shown in FIG. 4 in a [$D \times T_s$, $\frac{1}{2} \times (1+D) \times T_s$] period in the current working cycle, which is described in detail as follows:

step A-1: judging, by a control unit, whether a primary clamp switch $S_2$ is switched on or not: when the primary clamp switch $S_2$ is switched on, entering step A-2; and when the primary clamp switch $S_2$ is switched off, repeating step A-1;

step A-2: when the primary clamp switch $S_2$ is switched on, comparing and logically judging a first sensing voltage $V_{SR1}$ and a first threshold value $V_{t1}$ by a first comparator: when $V_{SR1}<V_{t1}$, an output signal A of the first comparator being at the high level, then entering step A-3; and when $V_{SR1}>V_{t1}$, the output signal A of the first comparator being at the low level, then repeating step A-2;

step A-3: judging that a synchronous rectifier SR is switched on according to that the output signal A of the first comparator is at the high level;

step A-4: setting a minimum switching-on time $T_{on(min)}$, in which no switching-off operation is allowed to avoid repeated switching-on and switching-off operations caused by false triggering; and after finishing the current working cycle and entering next cycle, repeating the logic flow of detection and control above.

Figure 5:
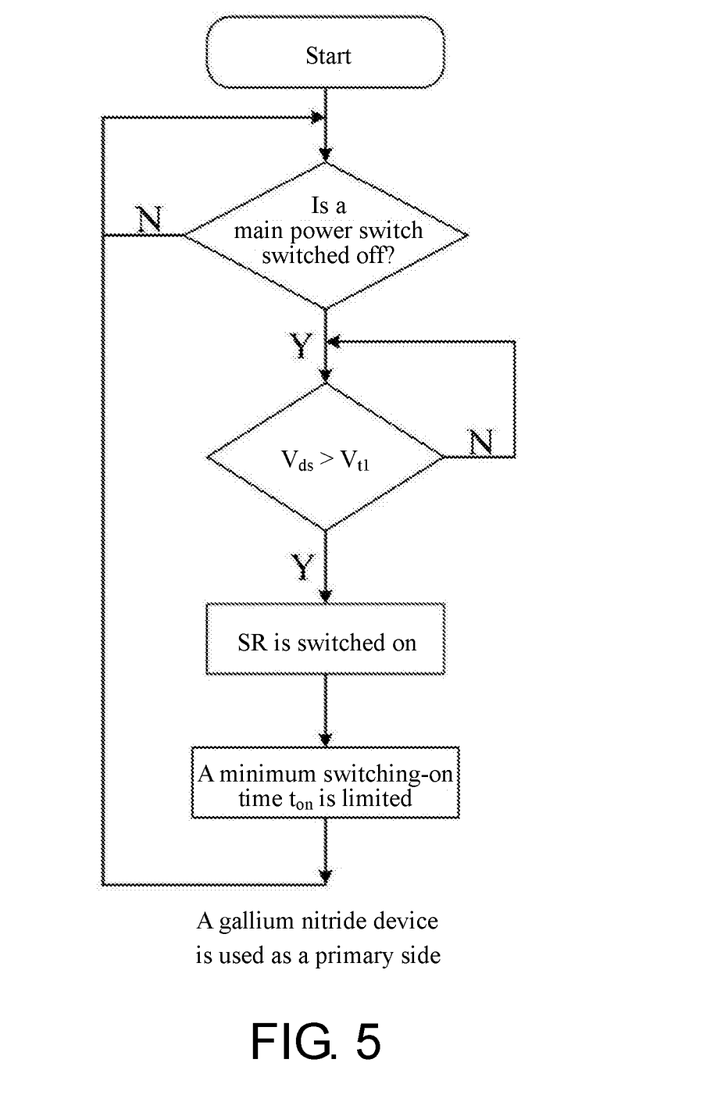
FIG. 5 is a logic flow chart of the detection and control of the switching-on state of the secondary synchronous rectifier when a gallium nitride device is used as the primary power switch of the active clamp flyback converter.

When the gallium nitride device is used as the primary power switch of the active clamp flyback converter, the logic flow of the detection and control of the switching-on state of the secondary synchronous rectifier is shown in FIG. 5 in the [$D \times T_s$, $\frac{1}{2} \times (1+D) \times T_s$] period in the current working cycle, which is described in detail as follows:

step B-1: judging, by the control unit, whether the primary main power switch $S_1$ is switched off or not: when the primary main power switch $S_1$ is switched off, entering step B-2; and when the primary main power switch $S_1$ is switched on, repeating step B-1;

step B-2: when the primary main power switch $S_1$ is switched off, comparing and logically judging the first sensing voltage $V_{SR1}$ and the first threshold value $V_{t1}$ by the first comparator: when $V_{SR1}<V_{t1}$, the output signal A of the first comparator being at the high level, then entering step B-3; and when $V_{SR1}>V_{t1}$, the output signal A of the first comparator being at the low level, then repeating step B-2;

Step B-3: judging that the synchronous rectifier SR is switched on according to that the output signal A of the first comparator is at the high level;

step B-4: setting the minimum switching-on time $T_{on(min)}$, in which no switching-off operation is allowed to avoid repeated switching-on and switching-off operations caused by false triggering; and after finishing the current working cycle, repeating the logic flow of detection and control above in the [$D \times T_s$, $\frac{1}{2} \times (1+D) \times T_s$] period in next cycle.

It can be seen from the second detailed embodiment that the self-adaptive synchronous rectification control method of an active clamp flyback converter proposed in the present invention is applied to occasions where different types of devices are used as the primary power switch.

Third Embodiment

Figure 6:
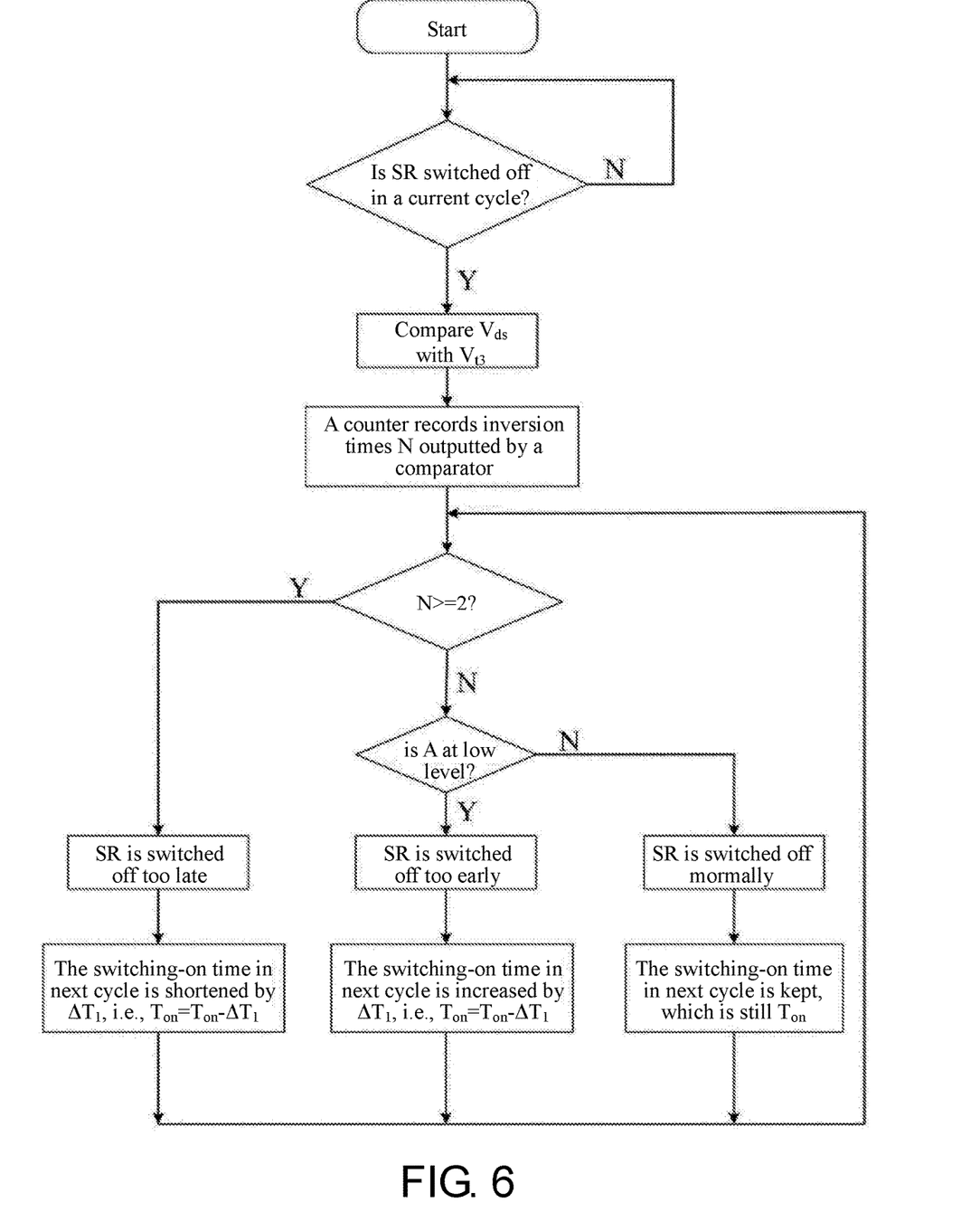
FIG. 6 is a logic flow chart of the detection of a switching-off state of the secondary synchronous rectifier of the active clamp flyback converter and the control of a switching-on time in next cycle.

With reference to FIG. 6, a logic flow of the detection of a switching-off state of a secondary synchronous rectifier of an active clamp flyback converter and the control of a switching-on time in next cycle is described in detail in the embodiment, which is specifically as follows:

step C-1: comparing and logically judging a first sensing voltage $V_{SR1}$ after a synchronous rectifier is switched off and a second threshold value $V_{t2}$ by a first comparator in a [$\frac{1}{2} \times (1+D) \times T_s$, $T_s$] period in the current working cycle: after the synchronous rectifier is switched off, when the first sensing voltage signal $V_{SR1}$ is less than the second threshold value $V_{t2}$, A being at the high level; when the first sensing voltage signal $V_{SR1}$ is greater than the second threshold value $V_{t2}$, A being at the low level;

step C-2: comparing a second sensing voltage $V_{SR2}$ after the synchronous rectifier is switched off and a third threshold value $V_{t3}$ by a second comparator, and outputting a signal B: after the synchronous rectifier is switched off, when $V_{SR2}<V_{t3}$, an output signal B of the second comparator being at the high level; and when $V_{SR2}>V_{t3}$, the output signal B of the second comparator being at the low level;

step C-3: using a counter to record a level inversion times N of the output signal B of the second comparator after the synchronous rectifier is switched off;

step C-4: judging a logical relationship between N and 2: when N is greater than or equal to 2, entering step C-11; and when N is less than 2, entering step C-10;

step C-10: judging a magnitude of the output signal A of the first comparator: when A is at the low level, entering step C-12; and when A is at the high level, entering step C-13;

step C-11: judging that the synchronous rectifier SR is switched off too late, and entering step C-14;

step C-12: judging that the synchronous rectifier SR is switched off too early, and entering step C-15;

step C-13: judging that the synchronous rectifier SR is switched off exactly, and entering step C-16;

step C-14: reducing a switching-on time of the synchronous rectifier SR in next cycle by $\Delta T_1$, i.e., $T_{on}^{n+1}=T_{on}^{n}-\Delta T_1$;

step C-15: increasing the switching-on time of the synchronous rectifier SR in next cycle by $\Delta T_2$, i.e., $T_{on}^{n+1}=T_{on}^{n}+\Delta T_2$;

step C-16: keeping the switching-on time of the synchronous rectifier SR in next cycle unchanged, i.e., $T_{on}^{n+1}=T_{on}^{n}$; and after finishing the current working cycle, repeating the logic flow of detection and control above in the [½×(1+D)×$T_s$, $T_s$] period in next cycle.

Figure 7:
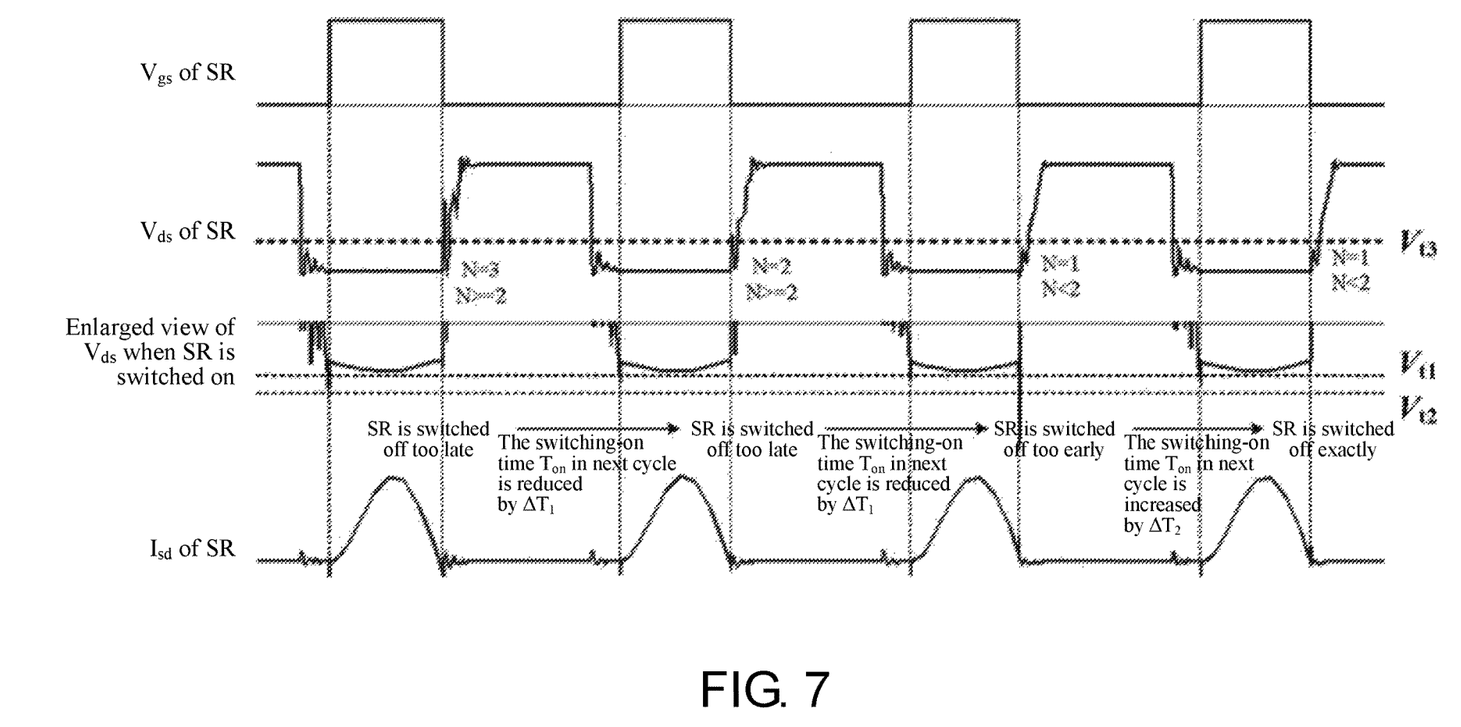
FIG. 7 is a diagram of switching-on and switching-off waveform effects of the embodiment of a self-adaptive synchronous rectification control method of an active clamp flyback converter proposed in the present invention.

FIG. 7 is a diagram of switching-on and switching-off waveform effects of the embodiment of a self-adaptive synchronous rectification control method of an active clamp flyback converter proposed in the present invention. It can be seen from the drawing that, in each working cycle, the synchronous rectifier is switched on at a time when $V_{ds}$ is less than the first threshold voltage $V_{r1}$, so that the self-adaptive synchronous rectification control method of an active clamp flyback converter proposed in the present invention can be used to detect the switching-on state of the synchronous rectifier. With reference to FIG. 7, a self-adaptive adjustment process of a switching-off state of the synchronous rectifier is described in detail, in a first working cycle shown in the drawing, a counting result of a counter is that N is equal to 3, the synchronous rectifier is judged to be switched off "too late" on this basis, and then the switching-on time of the synchronous rectifier is reduced by $\Delta T_1$ in next working cycle; in a second working cycle shown in the drawing, the counting result of the counter is that N is equal to 2, the synchronous rectifier is judged to be still switched off "too late" on this basis, and then the switching-on time of the synchronous rectifier still needs to be reduced by $\Delta T_1$ in next working cycle; in a third cycle shown in the drawing, the counting result of the counter is that N is equal to 1, the synchronous rectifier is judged not to be switched off too late on this basis, a value of the output signal A of the first comparator is further analyzed, it can be seen from the drawing that a waveform of $V_{ds}$ is already lower than a waveform of the second threshold value $V_{r2}$, i.e., A is at the low level, the synchronous rectifier is judged to be switched off too early on this basis, and then the switching-on time of the synchronous rectifier needs to be increased by $\Delta T_2$ in next working cycle; and in a fourth cycle shown in the drawing, the counting result of the counter is that N is equal to 1, and A is at the high level, the synchronous rectifier is judged to be switched off exactly on this basis, and then the switching-on time of the synchronous rectifier is kept unchanged in next working cycle.

It can be seen from the optimized embodiment that after a period of adjustment, the secondary synchronous rectifier of the active clamp flyback converter can be switched on at a correct time point and switched off at an appropriate time point, thus reducing oscillation of the waveform of the active clamp flyback converter, significantly improving an efficiency of the converter, reducing power consumption, reducing working interference and noise of the converter, and improving a working performance of the active clamp flyback converter.

The foregoing is merely partial embodiments of the invention, and it shall be noted that those of ordinary skills in the art may further make a plurality of improvements and decorations without departing from the principle of the invention, and these improvements and decorations shall all fall within the protection scope of the invention.

What is claimed is:

1. A self-adaptive synchronous rectification control system of an active clamp flyback converter, comprising:
   a sampling and signal processing circuit,
   a control circuit with a microcontroller as a core, and
   a gate driver,
   wherein an input end of the sampling and signal processing circuit is connected with a drain of a secondary synchronous rectifier of the active clamp flyback converter, a first output end and a second output end of the sampling and signal processing circuit are both connected with the control circuit with the microcontroller, an output end of the control circuit with the microcontroller is connected with an input end of the gate driver, and an output end of the gate driver is connected with a gate of the secondary synchronous rectifier of the active clamp flyback converter; wherein,
   the control circuit with the microcontroller comprises:
   a first comparator,
   a second comparator,
   a counter,
   a register,
   a control unit, and
   a pulse width modulation (PWM) timer,
   wherein the first comparator, the second comparator and the PWM timer are actual hardware function modules inside the microcontroller, the counter, the register and the control unit are software function modules implemented on a hardware basis of the microcontroller, a first sensing voltage signal outputted by the first output end of the sampling and signal processing circuit is connected with an inverting input end of the first comparator, a second sensing voltage signal outputted by the second output end of the sampling and signal processing circuit is connected with an inverting input end of the second comparator, non-inverting input ends of the first comparator and the second comparator are both connected with the control unit, and an output signal A of the first comparator is connected with a first input end of the register; an output signal B of the second comparator is connected with an input end of the counter, the counter records high and low level change times N of the output end signal B of the second comparator, and an output signal N of the counter is connected with a second input end of the register; the first output end and the second output end of the register are both connected with the control unit; an output signal of the control unit is connected with the PWM timer; and an output signal of the PWM timer is connected with the gate driver.

2. The self-adaptive synchronous rectification control system of the active clamp flyback converter according to claim 1, wherein the first comparator is multiplexed by time division in different state detection periods of each working cycle; in a switching-on state detection period of a synchronous rectifier in each of the working cycle, the first comparator is used for detecting the switching-on state of the secondary synchronous rectifier of the active clamp flyback converter; and in a switching-off state detection period of the synchronous rectifier in each of the working cycle, the first comparator and the second comparator are jointly used for detecting the switching-off state of the secondary synchronous rectifier of the active clamp flyback converter.

3. The self-adaptive synchronous rectification control system of the active clamp flyback converter according to claim 2, wherein in the switching-off state detection period of the synchronous rectifier in each of the working cycle, a non-inverting input signal of the first comparator is a second threshold value $V_{t2}$ provided by the control unit, and an inverting input signal of the first comparator is a first sensing voltage signal $V_{SR1}$ provided by the sampling and signal processing circuit; and an output signal of the first comparator is A; and in the switching-off state detection period of the synchronous rectifier in each of the working cycle, a non-inverting input signal of the second comparator is a third threshold value $V_{t3}$ provided by the control unit, and an inverting input signal of the second comparator is a second sensing voltage signal $V_{SR2}$ provided by the sampling and signal processing circuit; an output signal of the second comparator is B; the signal B is used as an input signal of the counter, and a counter outputs level inversion times N of the signal B.

4. The self-adaptive synchronous rectification control system of the active clamp flyback converter according to claim 1, wherein in the switching-on state detection period of the synchronous rectifier in each of the working cycle, a non-inverting input signal of the first comparator is a first threshold value $V_{t1}$ provided by the control unit, and an inverting input signal of the first comparator is a first sensing voltage signal $V_{SR1}$ provided by the sampling and signal processing circuit.

5. A self-adaptive synchronous rectification control method of the active clamp flyback converter implemented by the system according to claim 1, wherein in a switching-on state detection period of the synchronous rectifier in each working cycle, a switching state of a secondary synchronous rectifier of the active clamp flyback converter in the current cycle is detected and logically judged as follows:

when a first sensing voltage signal $V_{SR1}$ is less than a first threshold value $V_{t1}$, an output signal A of the first comparator is at the high level, thus judging that the secondary synchronous rectifier of the active clamp flyback converter is currently in a switching-on state; and when the first sensing voltage signal $V_{SR1}$ is greater than the first threshold value $V_{t1}$, the output signal A of the first comparator is at the low level, thus judging that the secondary synchronous rectifier of the active clamp flyback converter is currently in a switching-off state.

6. The self-adaptive synchronous rectification control method of the active clamp flyback converter according to claim 5, wherein in a switching-off state detection period of the synchronous rectifier in each of the working cycle, a state of the secondary synchronous rectifier of the active clamp flyback converter in the current cycle after being switched off is detected and logically judged, and a switching-on time of the synchronous rectifier in next working cycle is controlled according to a detection result, which is specifically as follows:

after the synchronous rectifier is switched off, when the first sensing voltage signal $V_{SR1}$ is less than a second threshold value $V_{t2}$, A is at the high level; when the first sensing voltage signal $V_{SR1}$ is greater than the second threshold value $V_{t2}$, A is at the low level; the register latches a value of A after the synchronous rectifier is switched off;

after the synchronous rectifier is switched off, when a second sensing voltage signal $V_{SR2}$ is less than a third threshold value $V_{t3}$, B is at the high level; when the second sensing voltage signal $V_{SR2}$ is greater than the third threshold value $V_{t3}$, B is at the low level; the counter records level inversion times N of the output signal B of the second comparator after the synchronous rectifier s switched off; and the switching-off state detection is judged in a sequence as follows:

step A-1: comparing a magnitude relationship between N and 2: when N is greater than or equal to 2, entering step A-2; and when N is less than 2, entering step A-3;

step A-2: judging that the synchronous rectifier is switched off too late according to that N is greater than or equal to 2, then reducing a switching-on time of the synchronous rectifier in next cycle by $\Delta T_1$, i.e., $T_{on}^{n+1}=T_{on}^{n}-\Delta T_1$;

step A-3: judging that the synchronous rectifier is not switched off too late according to that N is less than 2, then comparing a magnitude of A: when A is at the high level, entering Step A-4; and when A is at the low level, entering step A-5;

step A-4: judging that the synchronous rectifier is switched off too early according to that N is less than 2 and A is at the low level, then increasing the switching-on time of the synchronous rectifier in next cycle by $\Delta T_2$, i.e., $T_{on}^{n+1}=T_{on}^{n}+\Delta T_2$; and step A-5: judging that the synchronous rectifier is exactly switched off according to that N is less than 2 and A is at the high level, then keeping the switching-on time of the synchronous rectifier in next cycle unchanged, i.e., $T_{on}^{n+1}=T_{on}^{n}$.

7. The self-adaptive synchronous rectification control method of the active clamp flyback converter according to claim 5, wherein a $[D \times T_s, \frac{1}{2} \times (1+D) \times T_s]$ period in each of the working cycle is the switching-on state detection period of the secondary synchronous rectifier of the active clamp flyback converter; and a $[\frac{1}{2} \times (1+D) \times T_s, T_s]$ period in each of the working cycle is the switching-off state detection period of the secondary synchronous rectifier of the active clamp flyback converter.

8. The self-adaptive synchronous rectification control method of the active clamp flyback converter according to claim 7, wherein a minimum switching-on time and a minimum switching-off time are set; after the secondary synchronous rectifier of the active clamp flyback converter is switched on, a switching-off operation cannot be performed in the minimum switching-on time $T_{on(min)}$, and a duration of the minimum switching-on time is one quarter of the switching-off time of the active clamp flyback converter; and after the secondary synchronous rectifier of the active clamp flyback converter is switched off, a switching-on operation cannot be performed in the minimum switching-off time, and a duration of the minimum switching-off time is a dead time from switching off of a clamp power switch to switching on of a main power switch of the active clamp flyback converter.

9. The self-adaptive synchronous rectification control method of the active clamp flyback converter according to claim 7, wherein when a silicon device is used as a primary power switch of the active clamp flyback converter, the first comparator detects a switching-on state of a secondary synchronous rectifier switch of the active clamp flyback converter; and when a gallium nitride device is used as the primary power switch of the active clamp flyback converter, the first comparator detects the switching-on state of the secondary synchronous rectifier switch of the active clamp flyback converter.

* * * * *